G. E. RICHMOND.
SEPARATOR.
APPLICATION FILED MAR. 2, 1911.

996,526.

Patented June 27, 1911.
3 SHEETS—SHEET 3.

Witnesses
A. Tompkins
E. Schuller

Inventor
George E. Richmond
By
Hardway & Cathy
Attorneys

UNITED STATES PATENT OFFICE.

GEORGE E. RICHMOND, OF WHARTON, TEXAS, ASSIGNOR OF ONE-HALF TO PEOPLES OIL & COTTON COMPANY, OF WHARTON, TEXAS.

SEPARATOR.

996,526.  Specification of Letters Patent.   Patented June 27, 1911.

Application filed March 2, 1911.  Serial No. 611,791.

*To all whom it may concern:*

Be it known that I, GEORGE E. RICHMOND, a citizen of the United States, residing at Wharton, in the county of Wharton and State of Texas, have invented certain new and useful Improvements in Separators, of which the following is a specification.

My invention relates to new and useful improvements in separators, and more particularly to such devices as are designed to separate the hulls from the kernels of seeds which have been previously passed through a seed huller.

The object of the invention is to provide a device of the character described, which will receive the seed from a seed huller, which has removed the hulls from the kernel, and will separate the hulls from the kernels and discharge said hulls and kernels into separate receptacles.

With the above and other objects in view my invention has particular relation to certain novel features of construction, operation and arrangement of parts, an example of which is given in this specification and illustrated in the accompanying drawings, wherein:—

Figure 1:
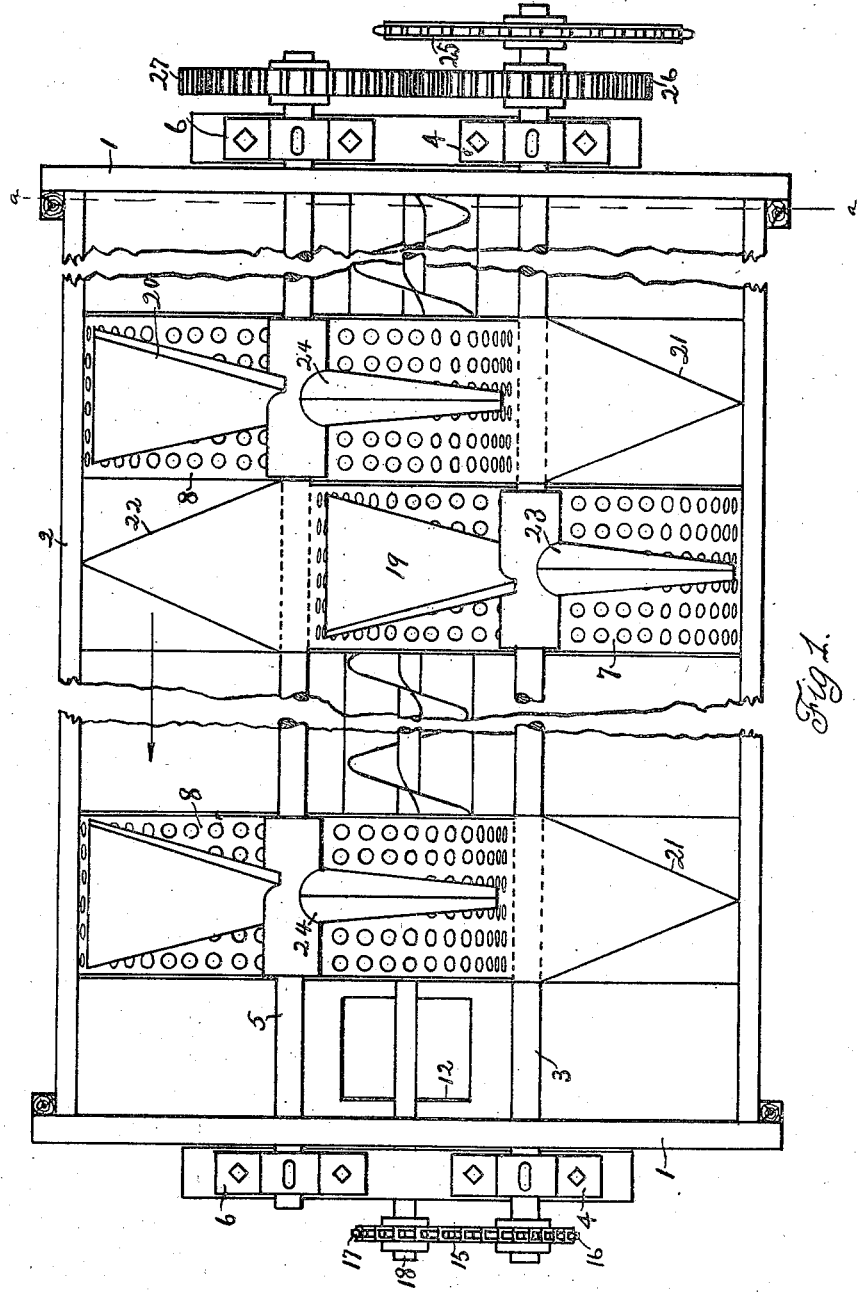
Figure 2:
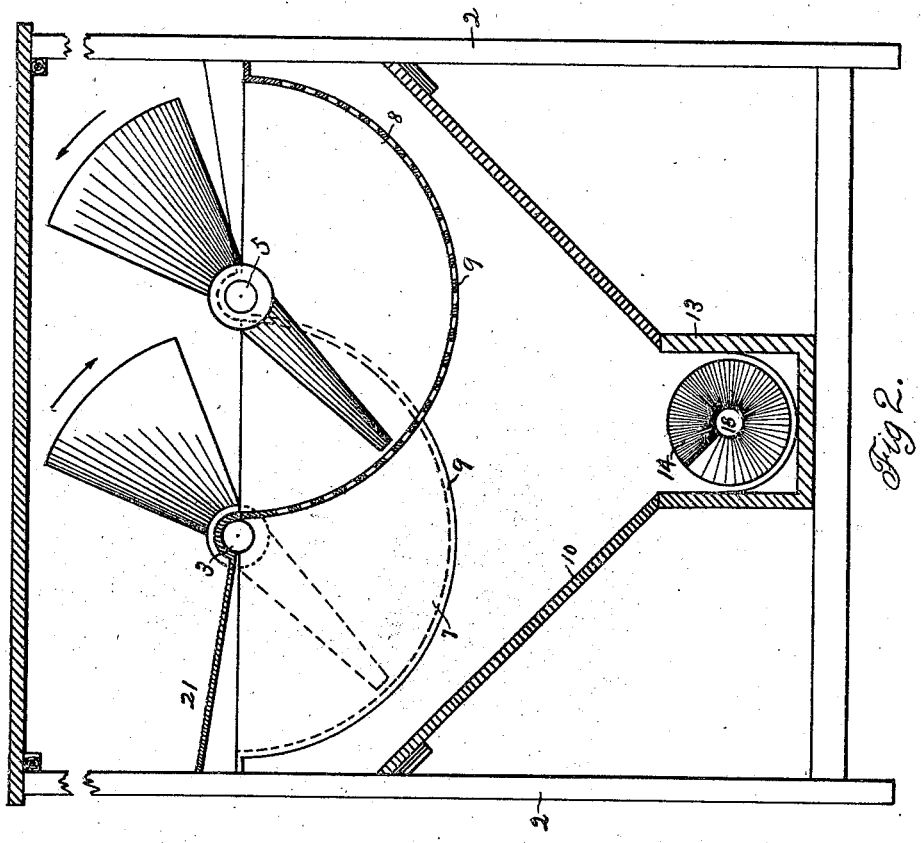

Figure 1 is a plan view of the separator showing certain portions thereof broken away. Fig. 2 is a sectional end view, taken on the line *a—a* of Fig. 1 and Fig. 3 is a side elevation thereof, showing the separator receiving from the seed huller and discharging the kernels into a suitable cooking receptacle.

Referring now more particularly to the drawings, wherein like numerals of reference designate similar parts in each of the figures, the numeral 1 refers to the end members of the casing, of the device, and the numeral 2 refers to the sides thereon. Mounted within this casing and extending lengthwise thereof is a shaft 3 rotatable in suitable bearings 4, 4, carried by the end members 1 and also the shaft 5 rotatable in bearings 6, 6 carried by said end members. These shafts are arranged parallel and lie in the same plane and are located near the top of the casing and each shaft is located the same distance from its respective side of the casing as the other shaft. Each side of the casing is provided with a plurality of compartments designated, respectively by the numerals 7, and 8 which are semi-cylindrical, in cross section, as shown in Fig. 2, and extend transversely in respect to the casing and the shafts 3 and 5 are arranged above these respective compartments and extend, centrally, across the same The compartments 7 are arranged in staggered relation to the compartments 8 and are separated, by suitable partitions therefrom, as shown in Fig. 1. These compartments are arranged in staggered relation and separated by partitions so that their contents, in being thrown back and forth will be thoroughly agitated and the passage of the kernels through the perforated bottoms will be facilitated. The bottoms of the compartments are composed of perforated sheet metal 9, through which the kernels of the seeds fall into hopper 10 arranged in the casing beneath said compartments.

Figure 3:
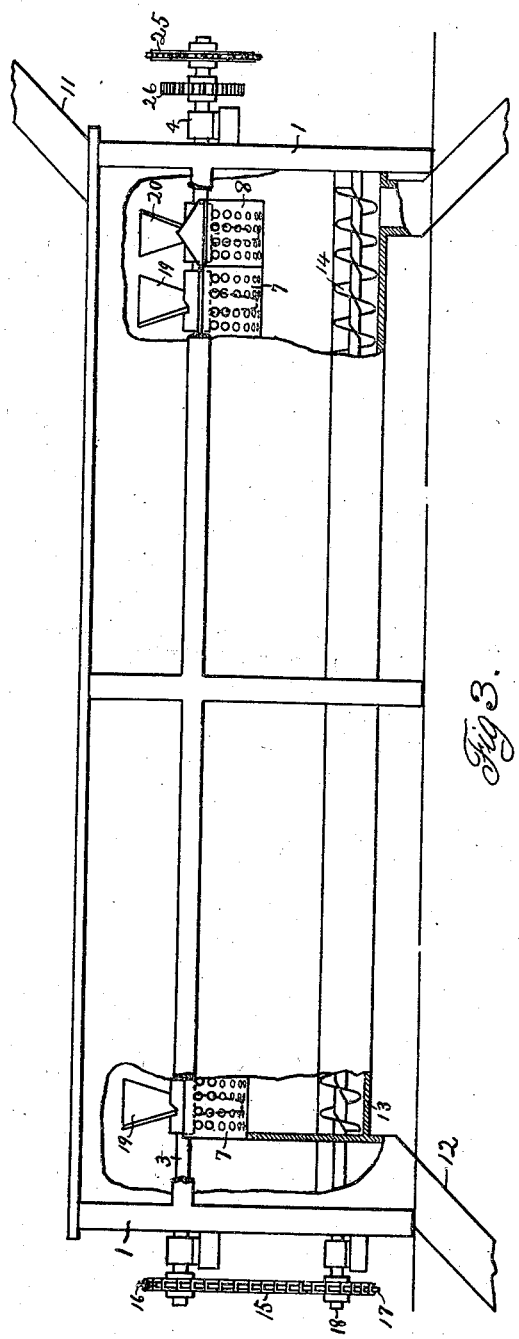

The seed is first relieved of its hulls by a seed huller (not shown), of any desirable construction, and is discharged into the separator from said huller through discharge spout 11, as shown in Fig. 3, and moves along through the separator in the direction indicated by the arrow in Fig. 1, the kernels, which have been relieved of their hulls falling through the perforated bottoms of compartments 7 and 8 into the hopper 10, and the hulls and unhulled seeds passing through discharge pipe 12 to be conducted to another huller (not shown), provided to hull the seed which are still unhulled. The kernels falling into the hopper 10 pass into conveyer 13 and are forced therealong by an auger shaped driving member 14 arranged lengthwise in said conveyer and rotatable therein. This driving member is operated by a suitable sprocket chain 15 having operative connections with sprocket wheels 16 and 17 rigidly mounted on the respective shafts 3 and 18.

The shafts 3 and 5, respectively, carry the laterally extending paddles 19 and 20, arranged above the respective compartments 7 and 8 and of a sufficient length to extend to the perforated bottoms of said compartments and to sweep therearound as their shafts rotate. The operative faces of the paddles 20 incline to the paths of rotation of the paddles and said inclined faces look toward the discharge end of the casing and the operative faces of the paddles 19 are similarly inclined and by the swift rotation of said paddles the contents of their compartments are thrown forward into the succeeding compartments, the contents of compartments 8 being thrown into compartments 7, and the contents of compartments 7 being thrown into compartments 8, the contents of all of the compartments thus moving back and forth from the receiving end, to the discharge end of the casing.

The numerals 21 and 22 refer respectively, to hoppers which extend from the side members 2 to the inner ends of the compartments 8 and 7 and decline slightly toward said compartments and are designed to catch any of the compartment contents which may be thrown beyond the ends of said compartments, and conduct the same into the compartments.

The numerals 23 and 24 refer to the arms which are carried, respectively, by the shafts 3 and 5 and which project therefrom in a direction the opposite of the respective paddles 19 and 20. These arms are triangular in shape and project into their respective compartments and agitate the compartment contents and cause the seed kernels to more readily pass through the perforated bottom of the compartments.

The shaft 3 receives motion from a suitable motor (not shown), through the sprocket wheel 25, rigidly mounted on the end of said shaft. The shaft 3 carries the rigidly mounted spur gear wheel 26 which meshes with a similar spur gear wheel 27, rigidly mounted on shaft 5, and transmits rotation from the former shaft to the latter.

What I claim is:—

1. A device of the character described including a suitable casing, a pair of rotatable agitator supports arranged in the casing, a plurality of compartments arranged beneath each of said agitator supports, the compartments beneath one agitator support being in staggered relation to the compartment beneath the other support, perforated bottoms for said compartments, agitators carried by each of said supports and projecting into the compartments therebeneath, a suitable hopper arranged beneath said compartments and receiving the contents discharged through the perforated bottoms thereof, a conveyer receiving the contents of said hopper and carrying a conveying means, and means for operating said rotatable supports and said conveying means.

2. A device of the character described including a suitable casing, a pair of rotatable agitator supports arranged in the casing, a plurality of compartments arranged beneath each of said agitator supports, the compartments beneath one of said supports being arranged in staggered relation to the compartments beneath the other support, perforated bottoms for said compartments, agitators carried by each of said supports and projecting into the compartments therebeneath, and means for rotating said supports.

3. A device of the character described including a suitable casing, a pair of rotatable agitator supports arranged in said casing, a plurality of compartments arranged beneath each of said agitator supports, the compartments beneath one of said supports being arranged in staggered relation to the compartments beneath the other support, a partition between said compartments, perforated bottoms for said compartments, agitators carried by each of said supports and projecting into the compartments therebeneath, the operative faces of said agitators being inclined to the plane of rotation thereof and looking toward the discharge end of the casing, a conveyer arranged beneath the compartments and receiving the contents discharged through the perforated bottoms thereof, and means for rotating said agitator supports and said conveyer.

4. A device of the character described including a suitable casing, a pair of rotatable agitator supports arranged in the casing, a plurality of compartments arranged beneath each of said agitator supports, the compartments beneath one of said supports being arranged in staggered relation to the compartments beneath the other support, perforated bottoms for said compartments, agitators carried by each of said supports and projecting into the compartments therebeneath, the operative faces of said agitators being inclined to the plane of rotation thereof and looking toward the discharge end of the casing, a conveyer arranged beneath the compartments and receiving the contents discharged through the perforated bottoms thereof, and means for rotating said agitator supports and said conveyer.

5. A device of the character described including a suitable casing, rotatable agitator supports arranged in said casing, a plurality of compartments arranged beneath each of said agitator supports, the compartments beneath one of said supports being arranged in staggered relation to the compartments beneath the other support, a partition between said compartments, an aperture in the bottom of said compartments, agitators carried by each of said supports and projecting into the compartment therebeneath, the operative faces of said agitators being inclined to the plane of rotation thereof and looking toward the discharge end of the casing, a conveyer arranged beneath the compartments and receiving the contents discharged through the apertures in the bottom of said compartments, and means for rotating said agitator supports and said conveyer.

In testimony whereof I have hereto set my hand this the 24 day of February, A. D. 1911.

GEORGE E. RICHMOND.

In the presence of—
F. BURTNER,
H. G. FORGOSON.